US012073973B1

(12) United States Patent
Jing et al.

(10) Patent No.: US 12,073,973 B1
(45) Date of Patent: Aug. 27, 2024

(54) OPPOSITE-FACING INTERLEAVED TRANSFORMER DESIGN

(71) Applicant: XILINX, INC., San Jose, CA (US)

(72) Inventors: Jing Jing, San Jose, CA (US); Shuxian Wu, San Jose, CA (US)

(73) Assignee: XILINX, INC., San Jose, CA (US)

( * ) Notice: Subject to any disclaimer, the term of this patent is extended or adjusted under 35 U.S.C. 154(b) by 633 days.

(21) Appl. No.: 17/180,411

(22) Filed: Feb. 19, 2021

(51) Int. Cl.
*H01F 27/00* (2006.01)
*H01F 27/28* (2006.01)

(52) U.S. Cl.
CPC ....... *H01F 27/006* (2013.01); *H01F 27/2804* (2013.01); *H01F 27/2885* (2013.01); *H01F 2027/2809* (2013.01)

(58) Field of Classification Search
CPC ............... H01F 27/006; H01F 27/2804; H01F 27/2885; H01F 2027/2809
USPC .......................................................... 307/104
See application file for complete search history.

(56) References Cited

U.S. PATENT DOCUMENTS 8,659,126 B2 * 2/2014 Lin ..................... H01L 23/5227 257/659
2013/0043968 A1 * 2/2013 Cho ..................... H01L 23/5223 336/200
2013/0044455 A1 * 2/2013 Cho ..................... H01L 23/5225 438/618
2013/0056853 A1 * 3/2013 Cho ..................... H01L 23/5225 257/E27.048
2013/0093045 A1 * 4/2013 Cho ......................... H01L 21/20 257/E21.575
2014/0170777 A1 * 6/2014 Cho ......................... H01L 28/40 438/3
2014/0353798 A1 * 12/2014 Cho ......................... H01L 21/20 257/531
2018/0076134 A1 3/2018 Jing et al.

* cited by examiner

*Primary Examiner* — Alfonso Perez Borroto
(74) *Attorney, Agent, or Firm* — Patterson + Sheridan, LLP

(57) ABSTRACT

A transformer includes a first inductor, facing in a first direction and a second inductor, facing in a second direction, the second direction opposite to the first. In one example the first and the second inductors are arranged such that the first inductor's legs extend to an area of the second inductor's head, and the second inductor's legs extend to an area of the first inductor's head.

20 Claims, 10 Drawing Sheets

200

OPPOSITE-FACING INTERLEAVED TRANSFORMER DESIGN

TECHNICAL FIELD

Embodiments of the present invention generally relate to transformers, and in particular to a transformer that includes opposite-facing interleaved inductors.

BACKGROUND

Transformers are often used in electronic circuits due to their significant compact size as compared to inductors. However, transformer performance is much more vulnerable to degradation, with a much worse temperature effect, due to the closely coupled inductors which transformers comprise. This presents significant challenges in many circuits, such as, for example, in the design of voltage controlled oscillators (VCOs). VCOs, it is noted, are one of the most critical components in modern communication devices, and transformers are a key component of VCOs.

On-chip inductor devices occupy a much larger area compared to other components, which leads to higher product cost and more power consumption. For example, for wide-band LC-tank circuit VCO designs, multiple inductors are usually needed in order to cover a sufficiently wide frequency range. The more inductors used in a circuit, the larger the chip area that is occupied.

One approach to save chip area such is to closely wind two inductors together. However, this approach significantly degrades inductor Q-factor and also causes higher temperature effects. Another approach is to place two inductors, one above the other, using different metal layers. However, this type of vertical stacking also introduces much higher parasitic capacitances between the two inductors, which results in degraded device performance.

What is needed is a transformer design that overcomes the aforementioned problems in the prior art.

SUMMARY

Various transformers and methods of providing them are described herein. In one example, a transformer is described. The transformer includes a first inductor, facing in a first direction, and a second inductor, facing in a second direction, the second direction opposite to the first. In addition, the first and the second inductors are arranged such that the first inductor's legs extend to an area of the second inductor's head, and the second inductor's legs extend to an area of the first inductor's head.

In another example, a method of providing a transformer is described. The method includes providing a first inductor, facing in a first direction and providing a second inductor, facing in a second direction, the second direction opposite to the first. The method further includes arranging the first and second inductors such that the first inductor's leg extends to an area of the second inductor's head, and the second inductor's leg extends to an area of the first inductor's head.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements of one embodiment may be beneficially incorporated in other embodiments.

DETAILED DESCRIPTION

In one or more examples, a transformer with shielding is described. In one or more examples, the transformer can greatly reduce chip area while still achieve high performance. The temperature effect of transformers according to one or more examples may be reduced by two-thirds, a feature that is highly beneficial to VCO design.

Figure 1:
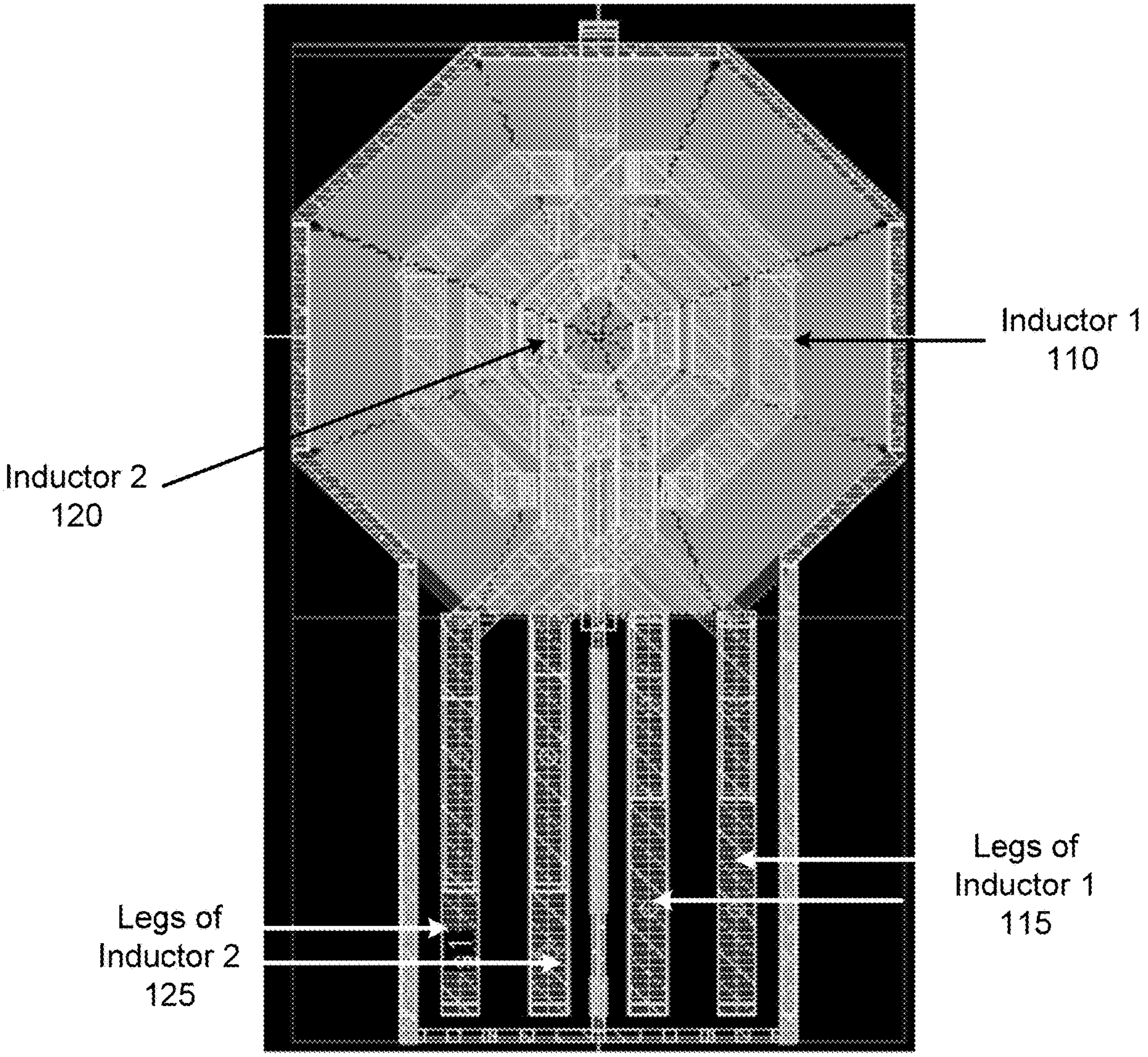
FIG. 1 illustrates a conventional transformer design.

FIG. 1 illustrates a conventional transformer design. In the example transformer of FIG. 1, as shown, there are two inductors that are closely wound together and facing the same direction. In this conventional transformer design performance may be dramatically degraded due to coupling between the two inductors, inductor 1 (110) and inductor 2 (120). As shown in FIG. 1, the heads of the two inductors are adjacent to each other, and their respective two pairs of legs 115 and 125 are interdigitated.

In one or more examples, a transformer design that can dramatically save chip area and still achieve high device performance is described. In one or more examples, a transformer includes two inductors facing in opposite directions, and one inductor's leg extends to the area of the other inductor's head region. In one or more examples, the transformer size may thus be reduced to almost half the size of the case with the two single inductors illustrated in FIG. 1. In one or more examples, the two inductors may either have the same coil design, or, for example, they may each have different designs, for example designs with at least one of different width, different spacing or different number of turns, to achieve different inductor characteristics, as may be desired in certain applications.

Figure 2:
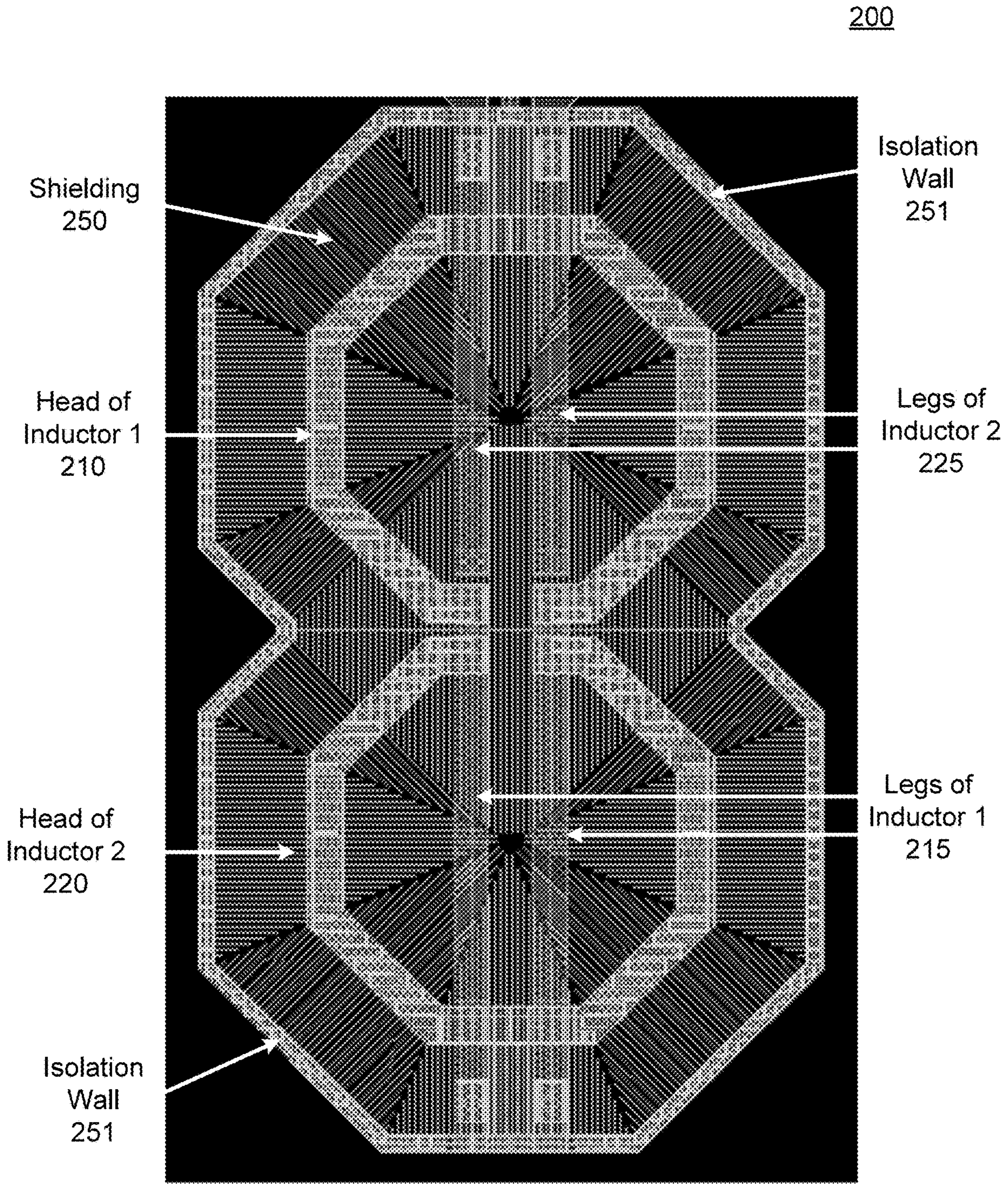
FIG. 2 illustrates a transformer, according to an example.

FIG. 2 illustrates a layout of an example transformer according to one or more examples. The transformer includes two inductors facing in opposite directions. With reference thereto, there is shown the head 210 of a first inductor, inductor 1, at the top of the figure. Also shown, within the interior of head 210 are the legs 225 of a second inductor, inductor 2. At the bottom of the figure is shown the head 220 of inductor 2, and within the interior of head 220 are provided the legs 215 of inductor 1. By facing the heads of the inductors opposite to one another, there is room for the legs of one inductor to fit within the interior of the head of the other inductor.

Continuing with reference to FIG. 2, there is also shown shielding 250, which is provided underneath the transformer and an isolation wall 251 that surrounds the transformer. Shielding 250 is described in greater detail below, with reference to FIGS. 4 and 5.

In the case of VCOs, when compared to conventional VCO designs that use two single inductors (not the example shown in FIG. 1, where the two inductors are intertwined), the example transformer of FIG. 2 may significantly save chip area by about 50%. This not only saves on chip cost, but also reduces chip power consumption, due to shorter wire routing distances across various circuits on the chip. Moreover, unlike the example of FIG. 1, the coupling of the two inductors is avoided, and quality factor is significantly improved.

In one or more examples, an inductor coil may be constructed with three top metal layers. For example, in a chip with 12 metal layers, from layers M11, M12 and AP. As noted, in one or more examples there may be an isolation wall 251 surrounding the transformer. Isolation wall 251 may be constructed with full metal layers from diffusion to AP to form a lowest impedance returning current path, as well as to isolate the environmental effects from surrounding circuitry. FIGS. 3A through 3E, next described, illustrate example layers of the transformer of FIG. 2, according to an example. In these figures the shielding 250 is not shown however, to simplify the viewability of the illustrated elements.

Figure 3A:
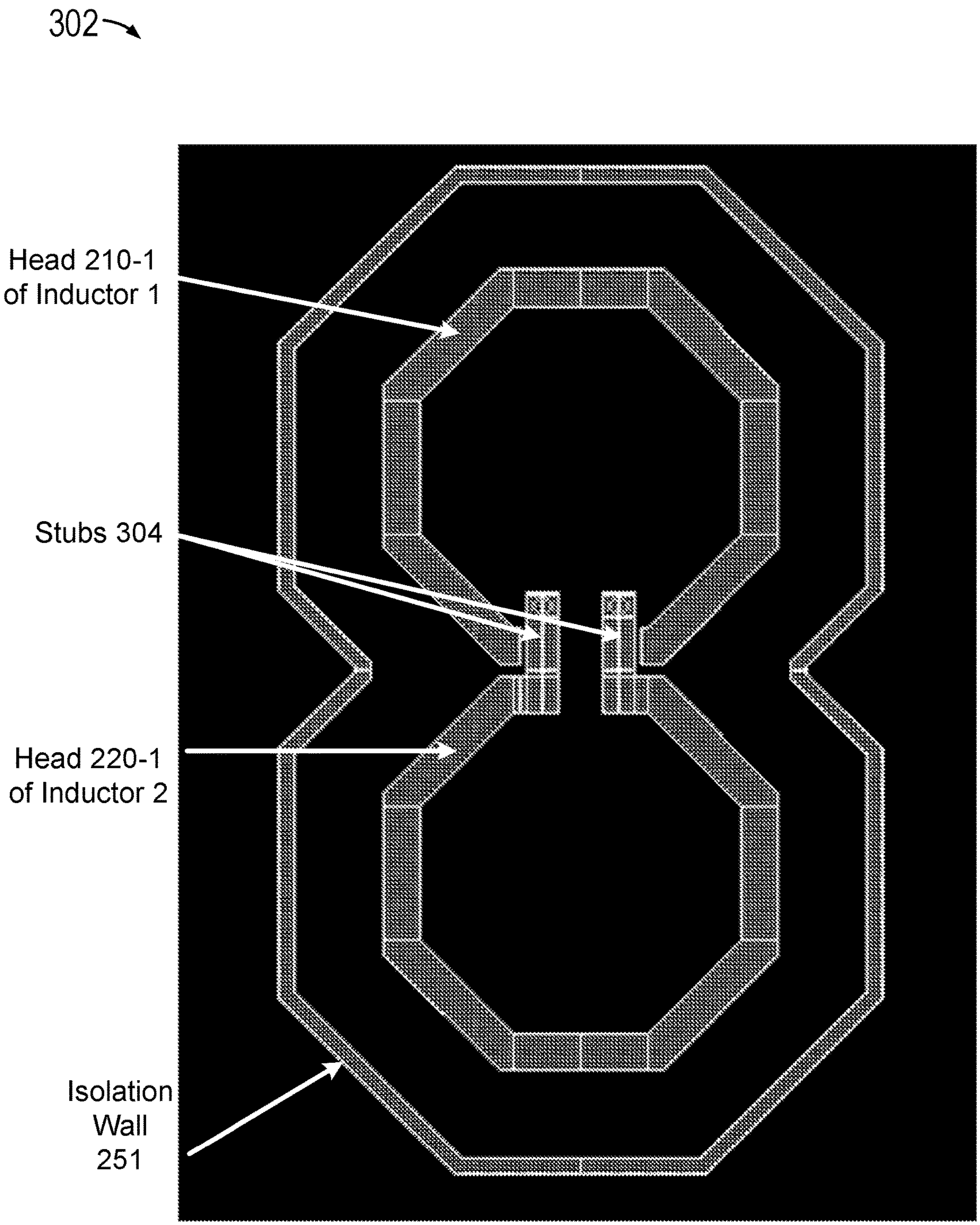
FIG. 3A illustrates a first metal layer of a transformer, according to an example.

FIG. 3A illustrates a coil layout of a first metal layer 302, according to an example. First metal layer 302 includes a first head 210-1 (i.e., windinqs/coils) of inductor 1 and a first head 220-1 of inductor 2, and stubs 304 for the legs 225 of inductor 2. A portion of isolation wall 251 is also part of this layer. In some examples, a transformer may comprise an upper two metal layers of a multiple layer die. In one example, where a semiconductor die has 12 metal layers and a top AP layer, the bottom layer of the transformer as shown in FIG. 3A (i.e., metal layer 302) may be the metal 11 layer. It is noted with reference to FIG. 3A that the first head 210-1 of inductor 1 is neither electrically connected to stubs 304 of inductor 2 nor to the first head 220-1 of inductor 2, as the two inductors must remain electrically separate on each layer to avoid a short circuit. Thus, in FIG. 3A first head 210-1 of inductor 1 has an open cut at its bottom so that stubs 304 of inductor 2 can extend inside first head 210-1, as shown. Thus, there are small gaps between the respective edges of first head 210-1 and stubs 304, as shown. However, the stubs 304 of inductor 2 are, of course, electrically connected to the first head 220-1 of inductor 2, also as shown. There are also shown connection pads 227 of inductor 2.

The two inductors in the transformer can have same shape or different design such as different metal layers, width, spacing or turns based on design requirement. The isolation wall follows the shape of the transformer to keep the same distance between the coil to the isolation wall. It can also forms a rectangular shape to enclose the transformer with larger spacing in the 45 degree angle region.

Figure 3B:
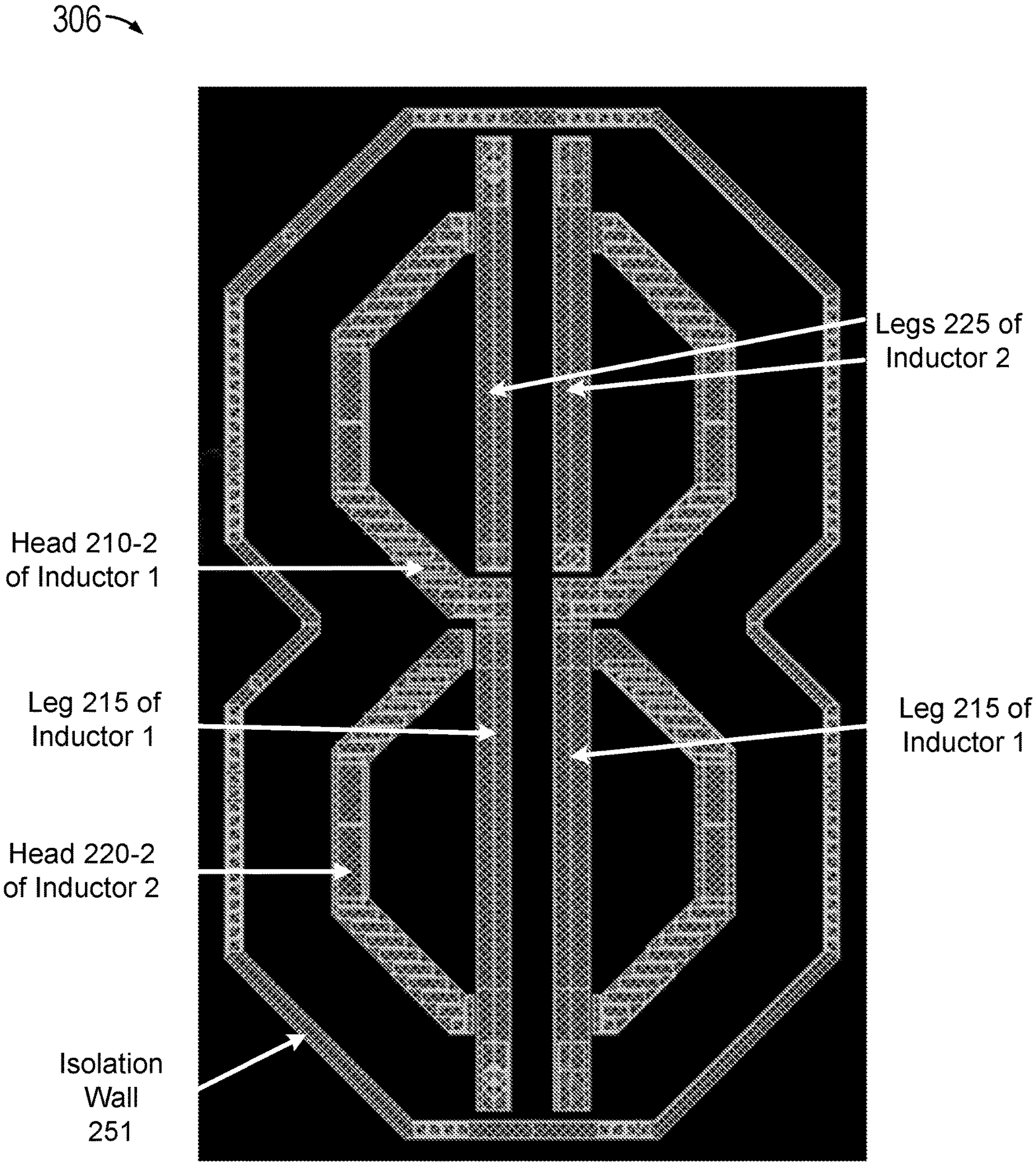
FIG. 3B illustrates a second metal layer of the transformer of FIG. 3A, according to an example.

FIG. 3B illustrates a second metal layer 306 of the transformer of FIG. 3A, according to an example. In the example described above where a semiconductor die has 12 metal layers and a top AP layer, the second metal layer 306 of the transformer as shown in FIG. 3B may be the metal 12 layer. Second metal layer 306 includes a second head 210-2 of inductor 1 and a second head 220-2 of inductor 2, legs 225 of inductor 2, and legs 215 of inductor 1. A portion of isolation wall 251 is also part of this layer, as shown. It is noted with reference to FIG. 3B, that the second head 210-2 of inductor 1 is electrically connected to the legs 215 of inductor 1. However, it is not connected to the second head 220-2 of inductor 2, as the two inductors must remain electrically separate on each layer to avoid a short circuit between them. Similarly, there is a gap in this layer at the bottom of the second head 220-2 of inductor 2, to allow the legs 215 of inductor 1 to pass through. Thus there are small gaps between each of these non-connected respective structures, as shown. The legs 225 of inductor 2 are not electrically connected to the second head 220-2 of inductor 2, also as shown, which is why the legs 225 of inductor 2 are shown in this layer as isolated rectangular structures at the top of FIG. 3B.

Figure 3C:
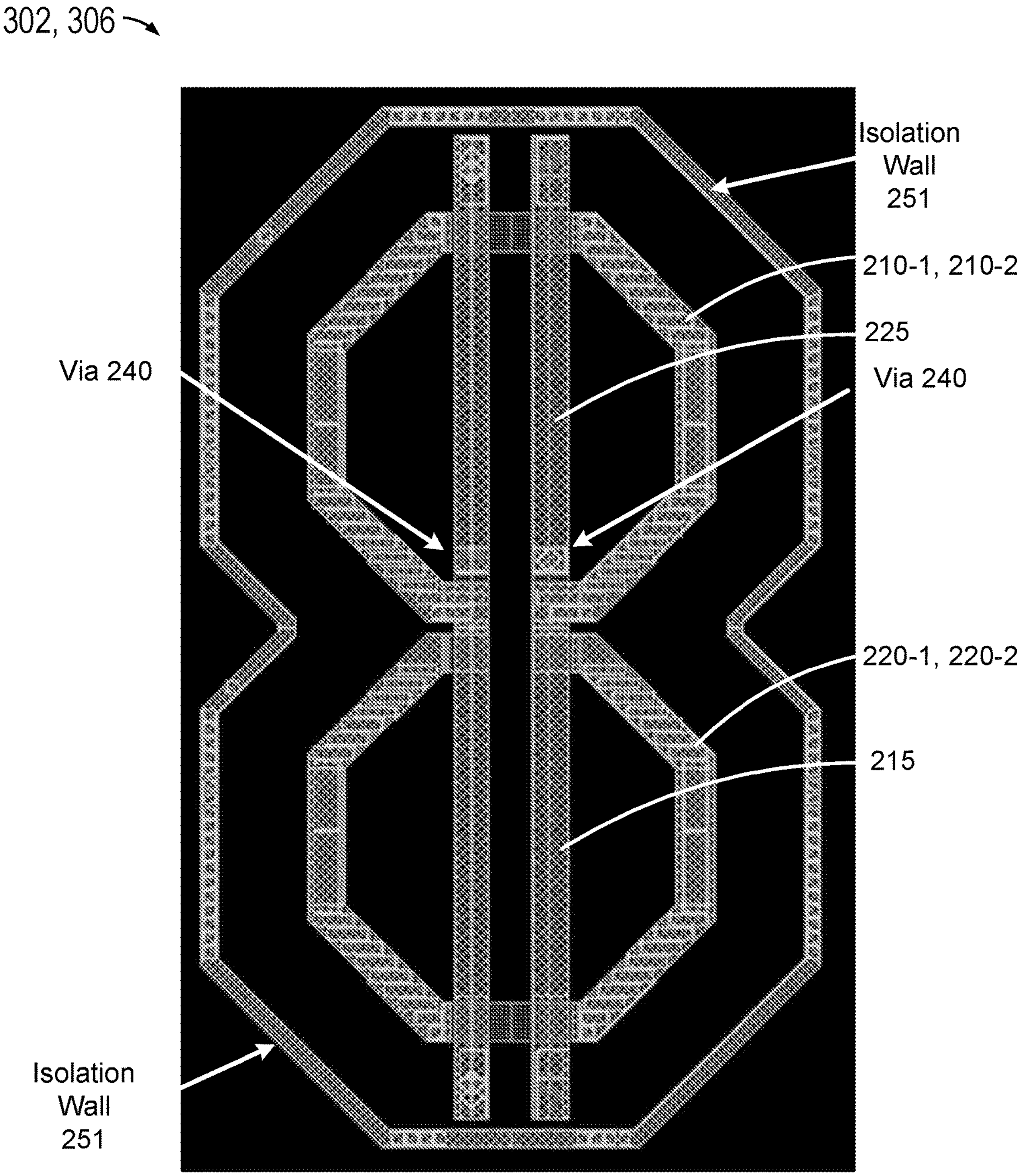
FIG. 3C illustrates a multiple layer stack including the first metal layer of FIG. 3A and the second metal layer of FIG. 3B connected by a set of vias, according to an example.

FIG. 3C illustrates a multiple layer stack including the first metal layer 302 of FIG. 3A and the second metal layer 306 of FIG. 3B connected by a set of vias, according to an example. In FIG. 3B, the first metal layer 302 of FIG. 3A is depicted underneath the second metal layer 306 of FIG. 3B. Thus, as one example, in the layer 306 of FIG. 3B, the legs 225 of inductor 2 are not connected to the head 220-2 of inductor 2, but legs 225 are connected to head 220-1 in the layer 302 of FIG. 3A, there are vias connecting these two layers at vias 240, shown in FIG. 3C. Given the two layers combined as shown in FIG. 3C, the complete structure of the transformer may now be seen.

Figure 3D:
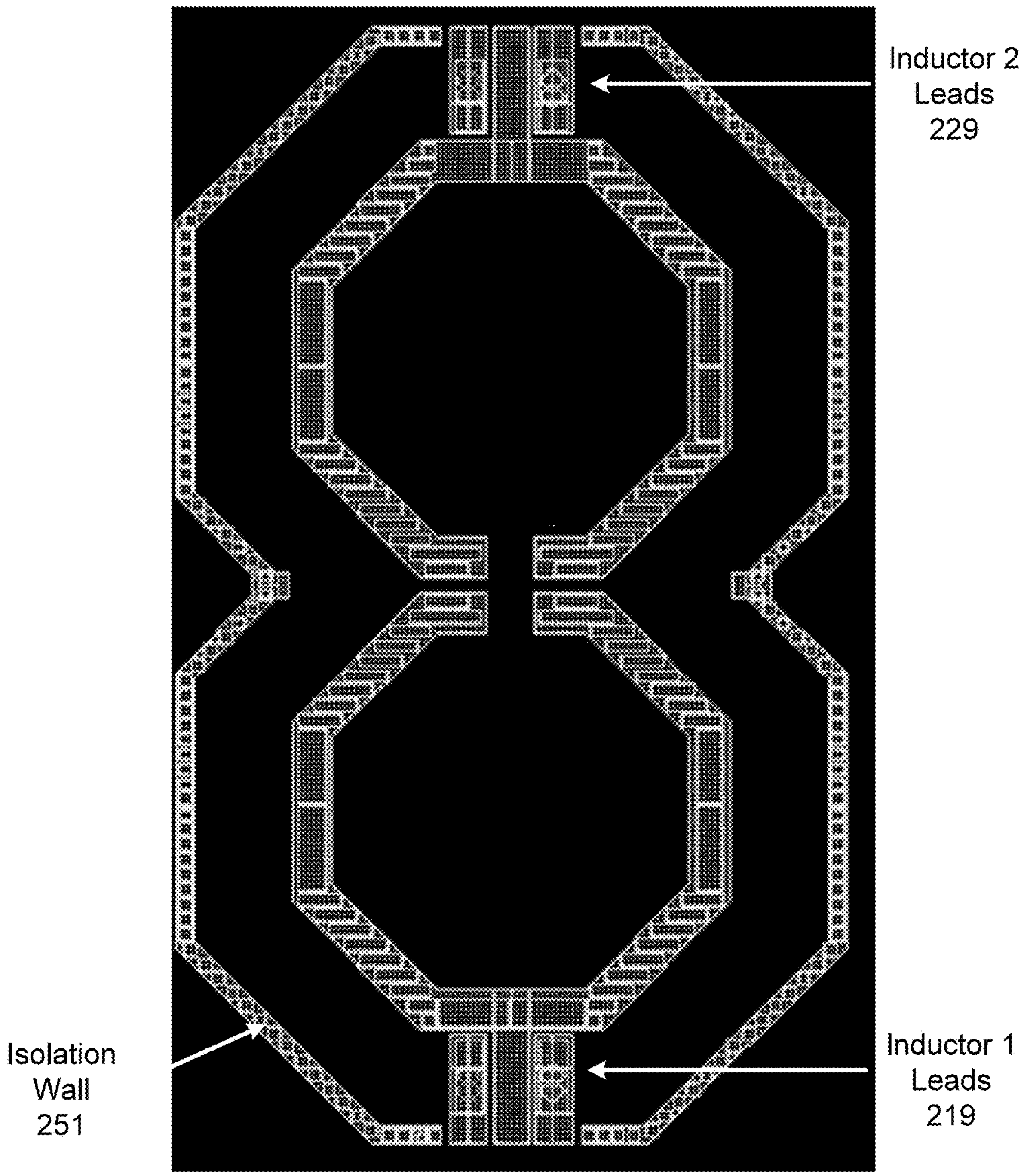
FIG. 3D illustrates an aluminum bond pad layer ("AP layer") of the transformer of FIGS. 3A-3C, according to an example.

FIG. 3D illustrates an aluminum bond pad layer ("AP layer") of the transformer of FIGS. 3A-3C, according to an example. In the example described above where a semiconductor die has 12 metal layers and a top AP layer, this is the AP layer, provided above the metal 12 layer of FIG. 3B. With reference to FIG. 3D, a center tap is formed with the AP layer for both inductors and they face opposite directions. Thus, the AP layer includes breaks in the isolation wall 251 at the top and bottom of the figure. These breaks allow, in some examples, leads 229 at the top of the inductor 2, and leads 219 at the bottom of inductor 1, to pass through the isolation wall 251 for connecting the transformer to other circuitry on the die. It is here noted that the legs of each inductor may either go out through the isolation wall, or stay inside it. If they stay inside it, then they connect to other circuitry via a vertical path, using vias. If they pass through the isolation wall, then they may connect horizontally to other circuitry. In a more compact design, the legs may stay within the isolation wall area, and connect to bottom circuitry vertically (by means of vias).

Figure 3E:
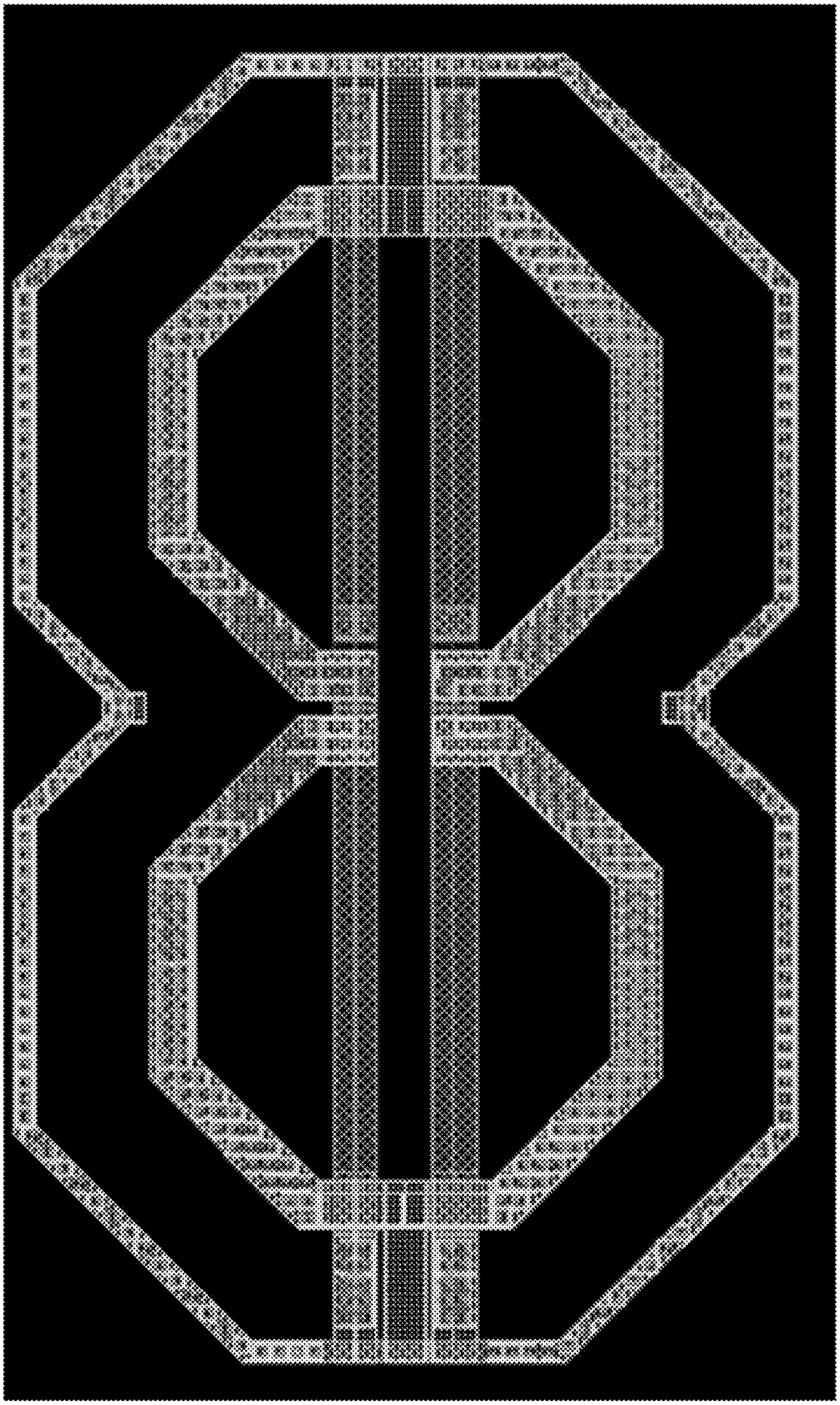
FIG. 3E illustrates a stack including the first metal layer of FIG. 3A, the second metal layer of FIG. 3B, connected by vias, the AP layer of FIG. 3D, and a redistribution via (RV) layer from the second metal layer to the AP layer, according to an example.

FIG. 3E illustrates a stack including the first metal layer of FIG. 3A, the second metal layer of FIG. 3B, connected by vias between the two layers as described above, the AP layer of FIG. 3D, and a redistribution via (RV) layer from the second metal layer of FIG. 3B to the AP layer of FIG. 3D, according to an example. Jumpers are needed to avoid shorting between the two inductors. This completes the structure of an example transformer, according to one or more examples.

Figure 4:
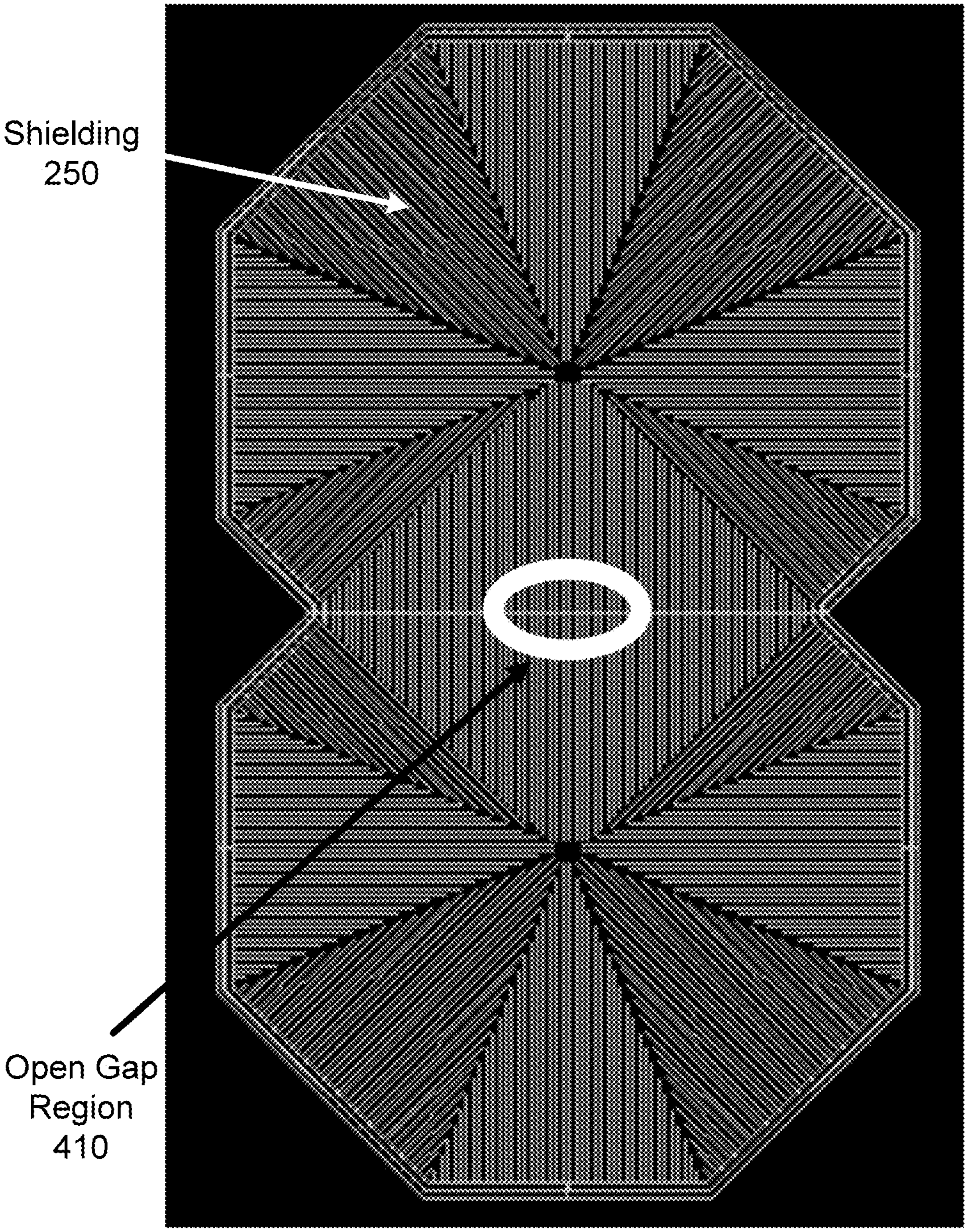
FIG. 4 illustrates pattern ground shielding for a transformer, according to an example.

FIG. 4 illustrates shielding 250 in isolation. As noted above, in one or more examples, pattern ground shielding (PGS) 250 may be provided beneath an example transformer. PGS is different than solid metal shielding, and has a pattern, as shown in FIG. 4. Thus, the PGS may be placed between the inductor and a silicon substrate to block the electric field and effectively cut off eddy current loss. The PGS also helps remove noise to substrate through isolation wall 251. In one or more examples, the PGS may be constructed with either the M11 layer, or with an intermediate metal layer. With an intermediate metal layer as PGS, some passive circuits may be placed underneath the transformer to further save chip area. In one or more examples, the PGS is made of narrow metal. The PGS, however, cannot form a complete loop in the middle, otherwise a large current loss may be generated. For this reason, an open gap is provided in a middle of the PGS, so that current cannot flow continuously, as described below with reference to FIG. 5.

In the example described above, where a semiconductor die has 12 metal layers and a top AP layer, shielding 250 may be provided in the $6^{th}$ metal layer, M6, for example. As shown in FIG. 4, a central region of the shielding 250 is surrounded by an ellipse. It is in this central region 410 that the open gap is provided in the shielding 250, and thus the central region may be referred to as "the open gap region 410". This is next described in detail with reference to FIG. 5.

Figure 5:
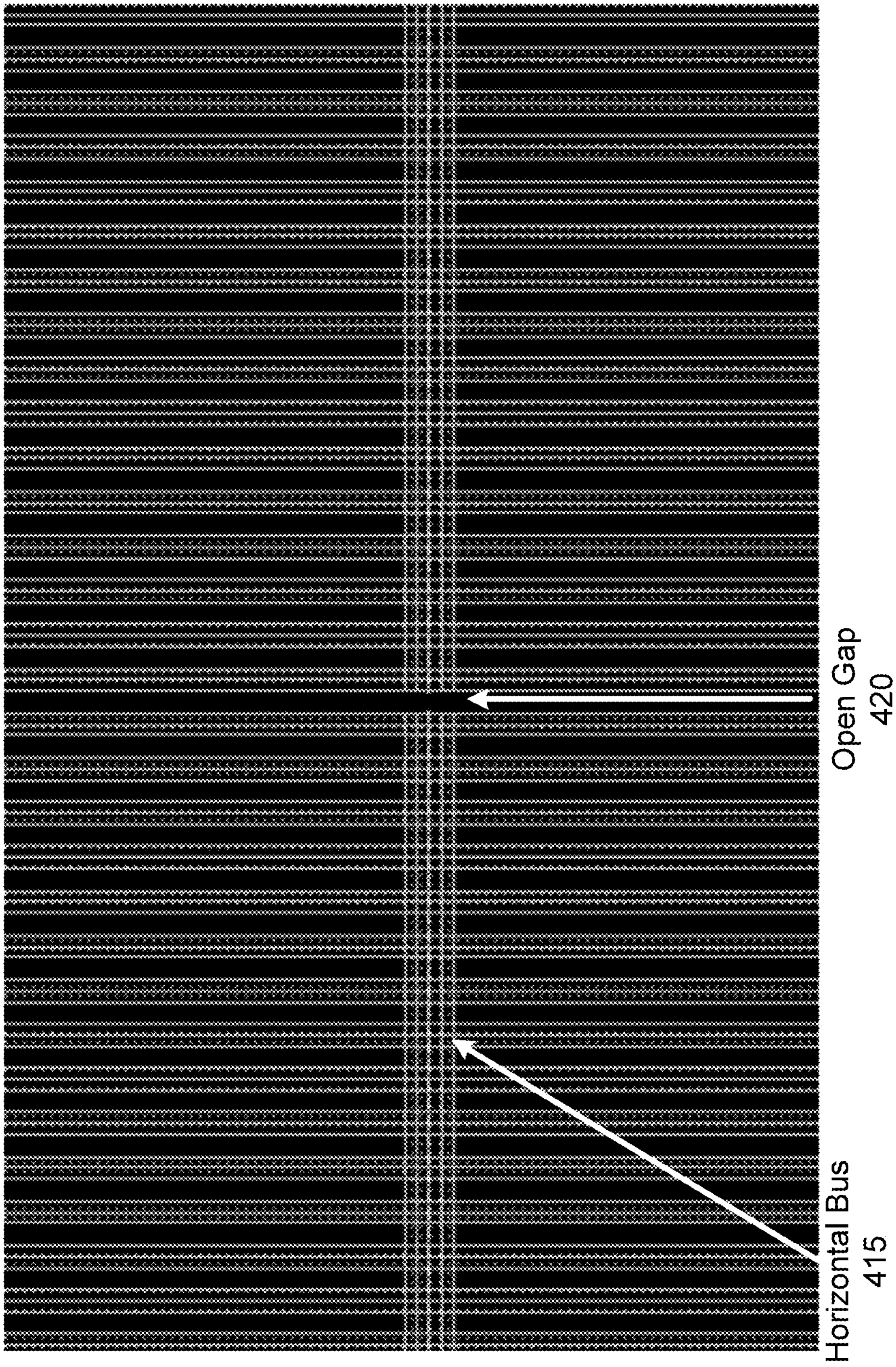
FIG. 5 is a magnified version of a central region of the pattern ground shielding of FIG. 4.

FIG. 5 is a magnified version of open gap region 410 of the pattern ground shielding 250 of FIG. 4. With reference to FIG. 5, there is a horizontal metal bus to connect the PGS between the two inductors with a gap in the center open gap region 410. The horizontal metal bus may be formed of multiple layers, just as is the case for the transformer. The open gap 420 in the middle of the horizontal bus 415 prevents their being a closed loop. Thus, in one or more examples, horizontal bus 415 may be used to connect the PGS to the two inductors with open gap 420 to avoid forming a closed loop around each inductor head.

As noted above, one way to reduce inductor chip area is to replace multiple inductors with much reduced number of transformers. Transformers can be designed in a very compact form with two inductors closely winding together as shown in FIG. 1, and this type of transformer design can save chip area by up to 50%. However, the performance of such a conventional transformer is greatly degraded due to high parasitics from the two closely coupled inductors. Therefore, it is essential to design a transformer which can not only save chip area but also maintain high device performance to be used for high performance and low cost VCO design.

The vertical overlapped transformer design also has much high coupling ratio, which not desirable for VCO applications.

In tests run by the inventors on a 16 nm RF test chip, it was confirmed that higher device performance is achieved relative to conventional transformers used in GTY VCO circuits. In particular, a significantly higher Q-factor was seen for each of the two inductors. In some tests Q-factor was improved by up to 48%.

Additionally, as regards coupling ratio K, a significantly smaller K was seen than a conventional transformer. This indicates significantly reduced coupling and interaction between the two inductors. The lower coupling ratio also corresponds to a lower temperature drift of VCO frequency, which is beneficial for VCO design.

Finally, transformers according to one or more examples were seen to have a smaller temperature effect in inductance (L) and coupling ratio (K), due to lesser coupling between the two inductors. It is noted that the temperature effect in L and K are two important transformer characteristics for VCO design. A higher temperature effect in L and K corresponds to a larger VCO frequency drift across temperatures. When this occurs, in order to minimize the temperature drift, additional circuitry may be used to compensate for VCO frequency drift across temperature, but this adds extra cost in both chip area as well as impact on VCO performance.

The higher the temperature drift, the larger compensation circuit needed. If the temperature drift is too large, adding to the compensation circuit alone may not be able to compensate for the temperature drift. Moreover, an additional temperature compensation circuit inevitably adds more parasitics to the VCO circuits, which makes it difficult for a transformer to meet an upper frequency target. In tests performed by the inventors on a prototype, transformers described above showed a temperature effect in L reduced by 50%, and a coupling ratio K reduction of 67%, which is significant for transformer based VCO designs.

Figure 6:
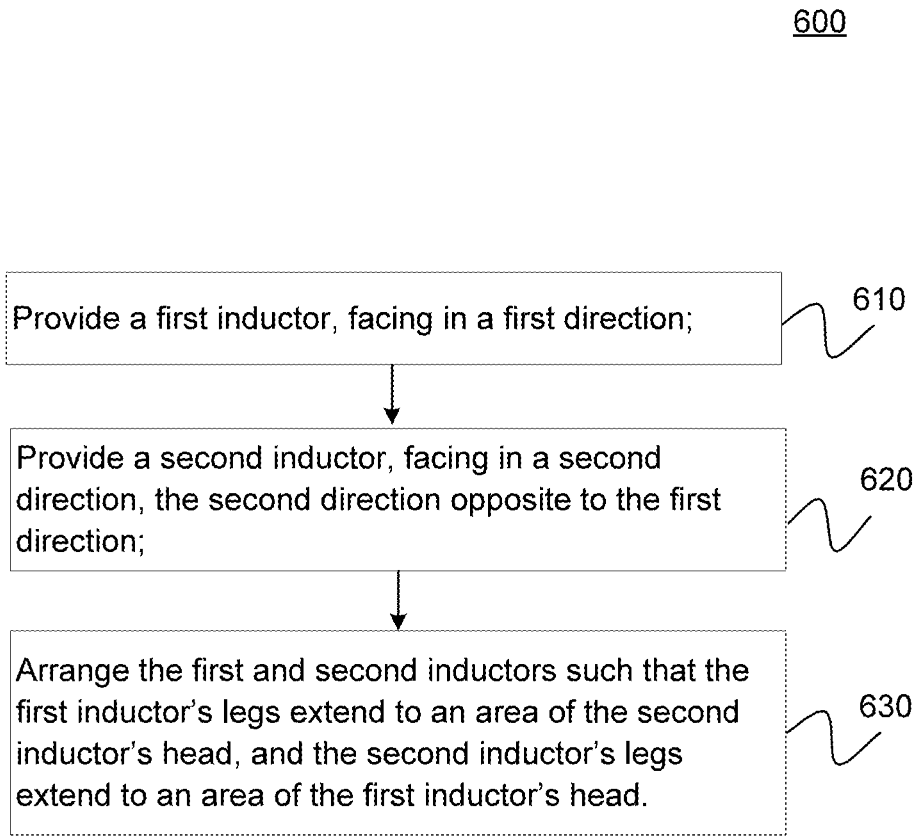
FIG. 6 is a flow diagram of a method for providing a transformer, according to an example.

FIG. 6 is a flow diagram of a method of providing a transformer, according to an example. Method 600 includes blocks 610 through 630. In alternate examples method 600 may include greater, or fewer, blocks. Method 600 begins at block 610 where a first inductor is provided. The first inductor is facing in a first direction. As used herein, the term "direction" in relation to an inductor refers to whether the inductor has its "legs up", legs above its head, or whether it has its "legs down", legs below its head. For example, the first inductor may be inductor 1 of FIG. 2, with its head 210 above its legs 215, and thus inductor 1 is in a "legs down" orientation.

At block 620, a second inductor is provided. The second inductor is facing in a second direction, the second direction opposite to the first direction. For example, the second inductor may be inductor 2 of FIG. 2, with its head 220 below its legs 225, and thus being in the "legs up" orientation. The second inductor, inductor 2, is thus in an opposite orientation from inductor 1, and thus inductor 2 faces a different direction than does inductor 1.

At block 630 the first and second inductors are arranged such that the first inductor's legs extend to an area of the second inductor's head, and the second inductor's legs extend to an area of the first inductor's head. For example, with reference to FIG. 2, the legs 225 of inductor 2 extend upwards within the head 210 of inductor 1, inductor 1 being in the "legs down" orientation. In similar fashion, the legs 215 of inductor 1 extend downwards within the head 220 of inductor 2, inductor 2 being in the "legs up" orientation.

Method 600 may terminate at block 630.

Thus, in one or more examples, the connections and routing of the two inductors in the opposite-facing interleaved transformer minimize parasitics to improve device performance.

While the foregoing is directed to embodiments of the present invention, other and further embodiments of the invention may be devised without departing from the basic scope thereof, and the scope thereof is determined by the claims that follow.

What is claimed is:

1. An integrated circuit (IC) device, comprising:

a first metal layer comprising a first coil of a first inductor, and a first coil of a second inductor adjacent to the first coil of the first inductor;

a second metal layer comprising a second coil of the first inductor, a second coil of the second inductor adjacent to the second coil of the first inductor, and legs of the first and second inductors;

wherein the first and second coils of the first inductor are vertically aligned with one another and connected to one another through a first set of vias of a dielectric material positioned between the first and second metal layers;

wherein the first and second coils of the second inductor are vertically aligned with one another and connected to one another through a second set of vias of the dielectric material; and wherein the first and the second inductors are configured as a transformer.

2. The IC device of claim 1, wherein:

the legs of the first inductor extend from the second coil of the first inductor to an inner region of the second coil of the second inductor via a gap in the second coil of the second inductor.

3. The IC device of claim 2, wherein:

the first level further comprises leg stubs of the second inductor;

the leg stubs extend from the first coil of the second inductor to an inner region of the first coil of the first inductor via a gap in the first coil of the first inductor;

at least a portion of the legs of the second inductor are positioned within an inner region of the second coil of the first inductor; and the legs of the second inductor are coupled to the leg stubs through additional vias of the dielectric material.

4. The IC device of claim 1, further comprising:

a substrate; and pattern ground shielding (PGS) positioned between the substrate and the transformer.

5. The IC device of claim 4, further comprising:

an isolation wall surrounding the transformer;

wherein the PGS is connected to the isolation wall.

6. The IC device of claim 4, wherein the PGS comprises:

first and second PGS portions separated from one another by a gap; and a bus configured to connect the first and second PGS portions to one another.

7. The IC device of claim 1, wherein a width, a spacing, and a number of turns of the first and second inductors are identical to one another.

8. The IC device of claim 1, wherein the first inductor and the second inductor differ from one another with respect to one or more of width, spacing and number of turns.

9. The IC device of claim 1, further comprising an isolation wall surrounding the transformer.

10. The IC device of claim 9, wherein a contour of the isolation wall matches a contour of the transformer.

11. An integrated circuit (IC) device, comprising:

a first metal layer comprising a first coil of a first inductor and a first coil of a second inductor adjacent to the first coil of the first inductor; and a second metal layer comprising legs of the first and second inductors;

wherein the first and second inductors are configured as a transformer.

12. The IC device of claim 11, wherein:

the second level further comprises a second coil of the first inductor and a second coil of the second inductor adjacent to the second coil of the first inductor; and the legs of the first inductor extend from the second coil of the first inductor to an inner region of the second coil of the second inductor via a gap in the second coil of the second inductor.

13. The IC device of claim 12, wherein:

the first level further comprises leg stubs of the second inductor that extend from the first set of windings of the second inductor to an inner region of the first set of windings of the first inductor via a gap in the first set of windings of the first inductor;

the legs of the second inductor are separated from the second set of windings of the second inductor and at least a portion of the legs of the second inductor are positioned within an internal region of the second set of windings of the first inductor; and the legs of the second inductor are coupled to the leg stubs through vias of a dielectric material positioned between the first and second levels.

14. The IC device of claim 11, further comprising:

a substrate; and pattern ground shielding positioned between the transformer and the substrate.

15. The IC device of claim 14, further comprising:

an isolation wall surrounding the transformer;

wherein the pattern ground shielding is connected to the isolation wall.

16. The IC device of claim 14, wherein the pattern ground shielding comprises:

first and second portions separated from one another by a gap; and a bus configured to connect the first and second portions of the pattern ground shielding to one another.

17. The IC device of claim 11, wherein a width, a spacing, and a number of turns the first and second inductors are identical to one another.

18. The IC device of claim 11, wherein the first and second inductors differ from one another with respect to one or more of width, spacing, and numbers of turns.

19. The IC device of claim 11, further comprising an isolation wall surrounding the transformer.

20. The IC device of claim 19, wherein a contour of the isolation wall matches a contour of the transformer.

* * * * *